(12) United States Patent
Brasier (10) Patent No.: US 6,227,992 B1
(45) Date of Patent: May 8, 2001

(54) TEXTILE FOR TENNIS BALL COVERING AND METHOD FOR MANUFACTURING THE SAME

(75) Inventor: Alan John Brasier, Stonehouse (GB)

(73) Assignee: Milliken Industrials Limited, Lancashire (GB)

( * ) Notice: Subject to any disclaimer, the term of this patent is extended or adjusted under 35 U.S.C. 154(b) by 0 days.

(21) Appl. No.: 09/343,351

(22) Filed: Jun. 30, 1999

(30) Foreign Application Priority Data

Jun. 30, 1998 (GB) .................................................. 9813966

(51) Int. Cl.⁷ .................................................. A63B 39/06
(52) U.S. Cl. .................................................. 473/606
(58) Field of Search .................... 473/606, 573, 473/569, 574, 596, 604, 605; 442/20, 25, 321, 323, 320, 324

(56) References Cited

U.S. PATENT DOCUMENTS

| 1,287,766 | 12/1918 | Saunders . | |
|---|---|---|---|
| 1,376,778 | 5/1921 | Orr . | |
| 1,547,339 | * 7/1925 | MacLellan | 473/598 |
| 2,023,673 | * 12/1935 | Ellis | 473/606 |
| 2,109,223 | * 2/1938 | Schmidt | 473/606 |
| 2,423,827 | * 7/1947 | Chagnon | 473/606 |
| 2,952,063 | * 9/1960 | Bukalders et al. | 473/606 |
| 3,065,520 | * 11/1962 | Schmidt | 473/606 |
| 3,558,413 | * 1/1971 | Wall | 473/606 |
| 4,234,643 | * 11/1980 | Grotefend et al. | 40/327 |
| 4,616,828 | 10/1986 | Haythornthwaite . | |
| 4,874,169 | 10/1989 | Litchfield . | |
| 5,404,626 | 4/1995 | Bylund et al. . | |

FOREIGN PATENT DOCUMENTS

441874 * 1/1936 (GB) .......................... 473/FOR 140

* cited by examiner

*Primary Examiner*—Steven Wong
(74) *Attorney, Agent, or Firm*—Ratner & Prestia (57) ABSTRACT

A fabric for use as a tennis ball covering and method to manufacture the same. The fabric has a felted outer surface composed of entangled fibres, said outer surface being provided with a three dimensional pattern thereon.

17 Claims, 7 Drawing Sheets

TEXTILE FOR TENNIS BALL COVERING AND METHOD FOR MANUFACTURING THE SAME

FIELD OF THE INVENTION

This invention relates to a textile for use in the manufacture of tennis balls and to a method of manufacturing the same.

BACKGROUND OF THE INVENTION

Conventionally, tennis balls are manufactured with the use of a textile having a felted surface. This means that the outer surface of the ball presents a layer of entangled fibres. The felt has a significant influence on the flight characteristics and feel of a tennis ball. Over the last 50 years a large number of attempts have been made to propose other types, (generally cheaper or having an increased resistance to wear) of non-felted tennis ball covering but they have been found unsuccessful to equal the feel and characteristic of the felted fabric and to replace the classic felted covering.

Thus, U.S. Pat. No. 4,874,169 describes a game ball having various types of depressions on one of its hemisphere. One particular ball is a tennis ball (see FIG. 5) having one hemisphere covered with a standard tennis ball covering and another covered by a plastic-like smooth material having grooves radiating from its pole.

It has been further proposed in U.S. Pat. No. 1,287,766 to replace the standard fabric covering of the tennis ball by a smooth and soft rubber-like material. Said rubber covering is provided with regular holes in order to mimic the skin friction of a standard tennis ball felt cover.

U.S. Pat. No. 4,616,828 describes a tennis ball having a deep groove extending in the rubber spherical core of the ball in order to control the air turbulence during the ball trajectory. In one embodiment it is proposed to cover the ball with a non-felted fabric made of woven synthetic filaments or fibres. These synthetic filaments are woven so as define a series of rectangular areas.

In U.S. Pat. No. 1,376,778 it is proposed to protect the seam of the textile and to produce a better controlling effect by compressing the outer fabric once provided on a tennis ball at various points along the seam. However, applying pressure to the tennis ball is not recommended as the pressure may alter the internal shape of the core of the ball. Also, compressed area obtained by such compression method are not very wear-resistant and disappear rapidly when used on a tennis ball.

A problem with the modern game of tennis is that as players become more and more powerful, less skill is needed to play the game. The game is fast and rarely are more than two or three shots played in a rally. This makes the games less enjoyable for spectators.

It would be desirable to have a felted tennis ball covering which would allow for greater control over the flight of the tennis ball. More particularly it would be desirable to have a felted tennis covering which, when applied to a tennis ball, alters substantially the flight and/or rebound characteristics when spin is imparted by the player to the ball. This would allow tennis players by imparting spin to various degrees to cause the ball to vary its course to a differing extent as it flies through the air and also to achieve a greater deviation from the expected path of the ball's rebound from the court.

SUMMARY OF THE INVENTION

According to a first aspect, the present invention provides with a fabric for use as a tennis ball covering said fabric having a felted outer surface composed of entangled fibres, said outer surface being provided with a three dimensional pattern thereon. Advantageously the fabric of claim 1, wherein said three dimensional pattern comprises a series of depressed and non-depressed areas.

Preferably, the fabric is a woven fabric comprising interlaced warp and weft threads and wherein said three dimensional pattern is generated by the variation of the interlacing frequency of said warp and weft threads. Advantageously, the fabric has depressed areas and non-depressed areas and the depressed areas are created by increasing the frequency of the interlacing of warp and weft threads. In particular, the non-depressed areas may be created by the weft threads interlacing every 5 to 10 warp threads and the depressed area are created by the weft threads interlacing 1 to 3 warp threads.

It is further preferred that the three dimensional pattern be generated by the variation in the entanglement rate of the fibres of the felted outer surface. Advantageously such variation in the entanglement rate is produced by needle felting techniques.

It is also preferred that the fabric comprises at least a support layer and an outer layer, said outer layer having a pattern cut through it and being affixed on the support layer to create said three dimensional pattern. Advantageously, the support layer includes a scrim and constitutes between 40 and 70% of the weight of the fabric.

It is further preferred that the fabric be provided with a pattern of regular indentations on the surface of the fabric. Advantageously the pattern can be a pattern of dimples, eventually circular in shape. The indentations may be to between 30% and 70% of the full thickness of the fabric and each indentation may have a diameter which is at its widest part between 5 mm and 20 mm.

It is further preferred that the indentations be separated by a portion of full thickness textile.

It is further preferred that the three dimensional pattern be formed on the fabric before the fabric is applied to a tennis ball.

The invention also provides various methods of manufacturing a fabric according to the first aspect of the invention. For example it is preferred to manufacture a fabric of the invention by interlacing warp and weft threads and generating a three dimensional pattern by varying the interlacing frequency of said warp and weft threads. According to another method a three dimensional pattern is created on a fabric of the invention by varying the entanglement rate of the fibres of the felted outer surface. A further method to manufacture a fabric of the invention comprises providing at least a support layer and an outer layer, said outer layer having a pattern cut through it and affixing said outer layer on the support layer to create said three dimensional pattern.

It is a further aspect of the invention to use such fabric to cover tennis balls. Such tennis balls being a further object of the invention.

BRIEF DESCRIPTION OF THE DRAWINGS

Embodiments of the present invention will now be described, by the way of example only, with reference to the accompanying drawings in which.

DETAILED DESCRIPTION OF THE PREFERRED EMBODIMENTS

Figure 1:
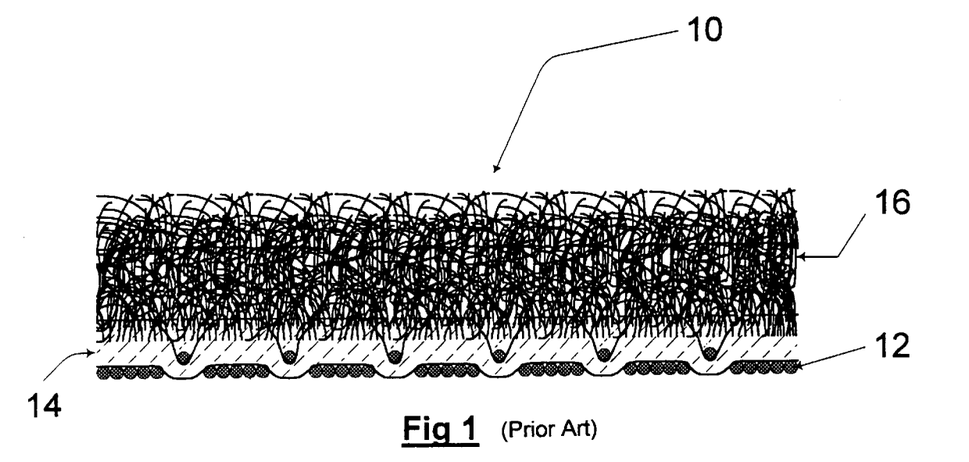
FIG. 1 is a schematic cross-sectional view of a piece of a standard woven felt.

The material usually used to cover a tennis ball is a felted fabric which can be either non-woven or woven. However, woven felt like the one shown in FIG. 1 is preferred in order to achieve covering of a better quality and in particular wear-resistance. The standard woven felt 10 shown in FIG. 1 consists of a cotton warp yarn 12 and a wool/nylon weft yarn 14 which are woven together. An outer surface of entangled fibres 16 gives the fabric 10 a felted appearance. The felted surface 16 is the outer or playing surface, once the woven felt 10 is used to cover a tennis ball. In the fabric 10 each weft yarn 14 interlaces every six warp yarn 12. This frequency may vary from five to ten warp yarns or threads 12 and is typically seven.

Usually the overall thickness of a woven felt 10 as the one shown in FIG. 1 is uniform and typically between 2.5 and 3.8 mm. However the thickness depends on the end product style and the measurement method carried out.

Tennis balls can be made to curve in flight by imparting spin due to the physical phenomenon known as the "Magnus Effect". Air is a fluid medium. When a ball flies through the air its passage displaces the air but it also carries some air with it close to the surface of the ball. This is known as the "boundary layer". If the ball is spinning it imparts a spinning motion to the air in the boundary layer. The motion imparted to the boundary layer affects the way the air flow separates from the surface at the rear of the ball. Boundary layer separation is delayed on the side of the ball which is moving in the same direction as the free air flow, and occurs prematurely on the side moving against the free air flow. The turbulent wake of the ball is thus moved towards the side of the ball moving against the free air flow resulting in the flow past the ball being deflected and the resulting change momentum flux causes a force in the opposite direction.

Figure 2:
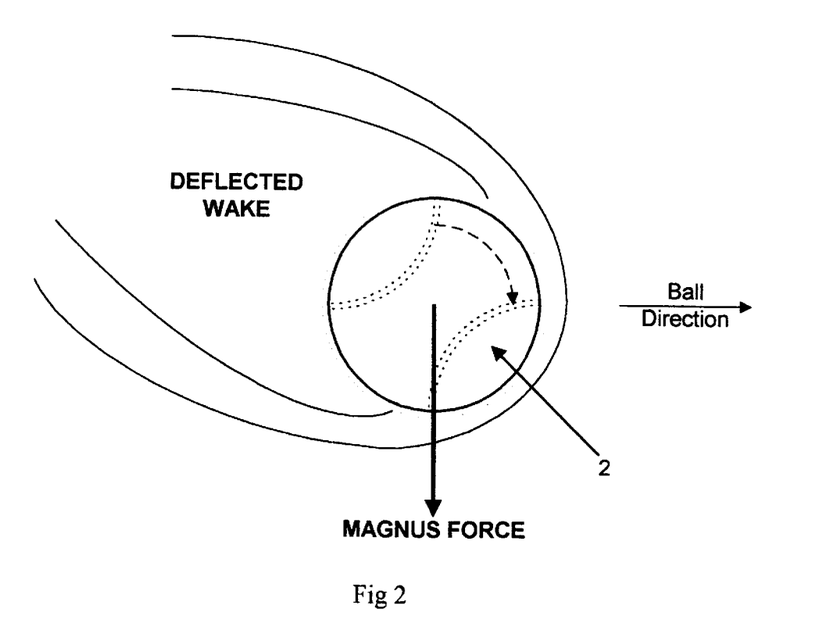
FIG. 2 is a schematic diagram representing a tennis ball travelling from left to right and showing the resultant Magnus force on the ball.

FIG. 2 is a schematic diagram representing a tennis ball 2 travelling from left to right and spinning in a clockwise direction and shows the resultant Magnus force on the ball 2. Thus, were this illustrating topspin, the ball 2 would be deflected downward by the Magnus Force.

The strength of the Magnus effect is in direct proportion to the rate of spin, the speed of the ball 2, the density of the air and the thickness of the boundary layer.

It is believed that a felted covering associated with the patterned surface of the tennis ball increases the thickness of the boundary layer around the ball and also helps to increase the friction between the racquet and the ball when the ball is struck. The combination of the thicker boundary layer together with the player's ability to impart increased spin due to better 'grip' on the ball increases the Magnus Force and thus the degree of 'curve' imparted to the ball.

Figure 3:
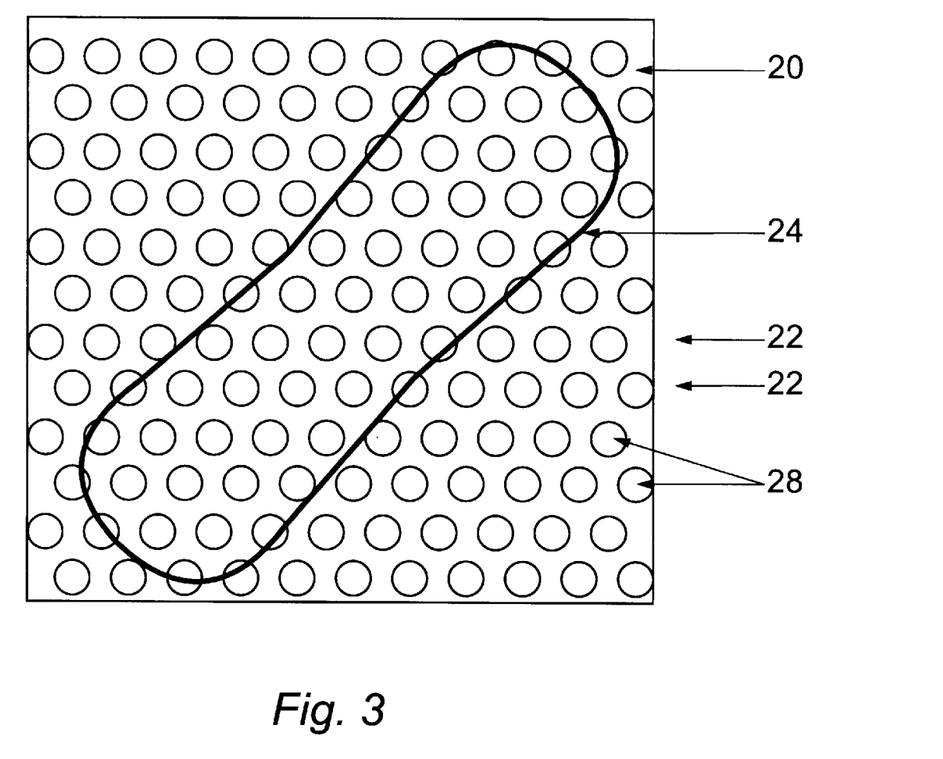
FIG. 3 is a schematic plan view of a first embodiment of a fabric according to the invention.
Figure 4:
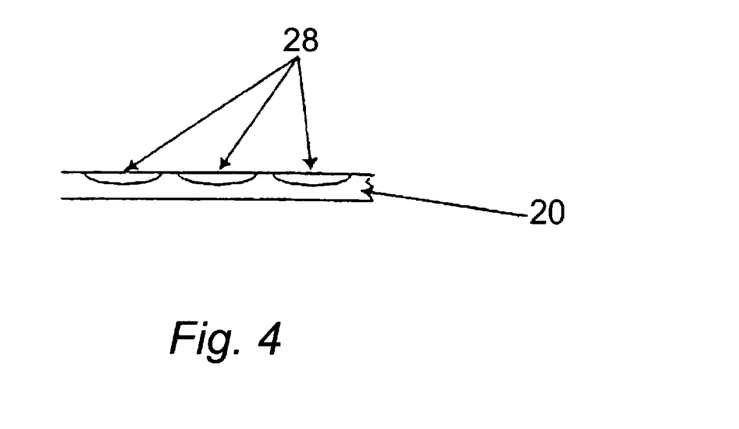
FIG. 4 is a partial cross-sectional view of the fabric of FIG. 3.

FIGS. 3 & 4 show a piece of fabric 20 according to a first embodiment of the invention which, like the standard fabric 10, preferably comprises a cotton warp yarn 22 and a wool/nylon weft yarn 24 which are woven together. A surface of entangled fibres (not shown but of a structure similar to the one shown in FIG. 1) is present on the outer surface and gives to the fabric 20 a felted appearance. A series of depressions or dimples 28 are provided on the surface of the fabric. In FIG. 3 the dimples 28 are provided on the fabric regularly, and the felt 20 has a pattern of 10 mm circular dimples 28 at 12 mm centres. The dimples 28 are provided in parallel rows 22 and each row 22 is offset from the next by 6 mm. Such dimensions have been found to give to the ball particularly good properties but it is within the scope of the invention to cover variations in these dimensions and other indentation patterns. Possible methods of forming dimples 28 will be discussed below.

FIG. 4 shows a schematic cross section of a the fabric 20 shown in FIG. 3 and the depressions in the surface. Such depressions are formed by the dimples 28 in the original piece of woven felt. At their deepest point, the dimples of FIGS. 3 and 4 are approximately 1.5 mm deep. The full thickness of the fabric 20 shown in FIGS. 3 and 4 is preferably about 3.5 mm.

Also clearly visible in FIG. 3 is the shape of a ball dumbbell 24 which is to be cut from the piece of woven felt 20, for eventually covering a tennis ball.

Usually two pieces of this shape are needed in order to achieve total covering of a tennis ball. In this particular embodiment the a distribution or pattern of dimples 28 on the ball is overall irregular.

The fabric according to the invention can be made according to known techniques in the art. However the following techniques are much preferred as they give fabrics particular characteristics, such as feel and resistance to wear.

Figure 5:
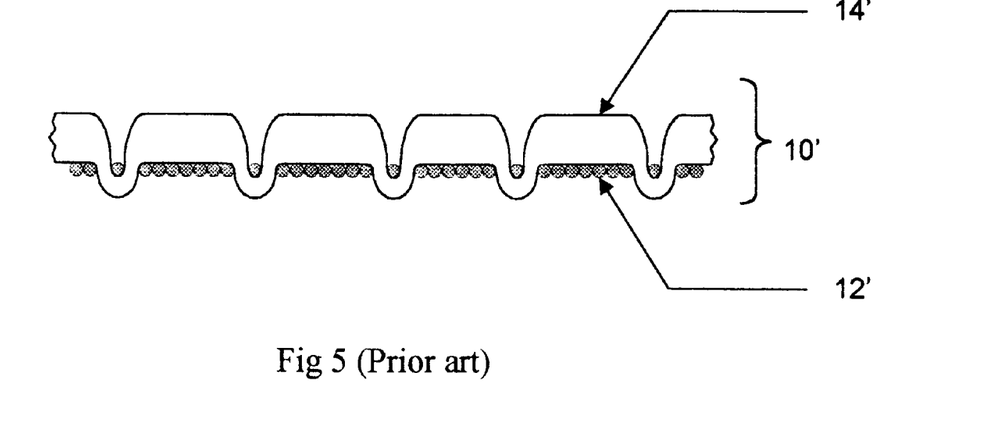
FIG. 5 is a schematic cross-sectional view of a portion of the interlacing of the weft and warp threads in a standard woven fabric used for tennis ball covering.

FIG. 1 shows a standard woven felt fabric 10 used to cover a tennis ball. FIG. 5 shows another standard woven felt fabric 10' used for covering a tennis ball wherein the finishing process of raising and milling has not been carried out yet and no felted layer is present. As shown in FIGS. 1 and 5 the standard woven felt fabric 10 or 10' used for a tennis ball usually uses a 'sateen' weave or modification thereof. With this form of weave long 'floats' of woollen spun weft yarn 14 or 14' are produced. Typically these weft threads 14 or 14' may 'float' over warp threads 12 or 12' interfacing with only one warp thread 12 or 12' in six (like the fabric 10 shown in FIG. 1) or in eight (like the fabric 10' shown in FIG. 6). Using this form of construction the weft threads 14 or 14' lie predominantly to one side of the fabric 10 or 10' and eventually form the outer surface of the fabric 10 or 10' and thus the outer (playing) surface of the tennis ball. Thus, weft threads 14 or 14' lie predominantly on the outer surface of the fabric 10 or 10' and the warp threads 12 or 12' predominantly on the back. Each weft thread 14' is interlaced with different warp threads 12' until a pattern repeat is achieved. Then, raising and milling steps are performed to "finish" the fabric 10 and 10' and gives it the felted cover 16 (not shown in FIG. 5).

Figure 6:
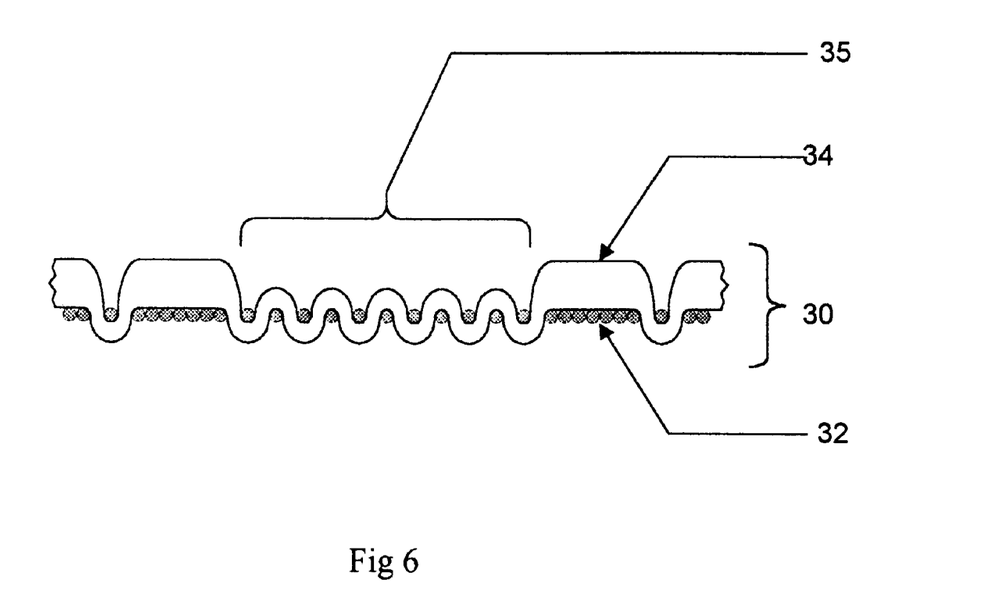
FIG. 6 is a schematic cross-sectional view of a portion of the interlacing of the weft and warp threads in a woven fabric made according to a second embodiment of the invention.
Figure 7:
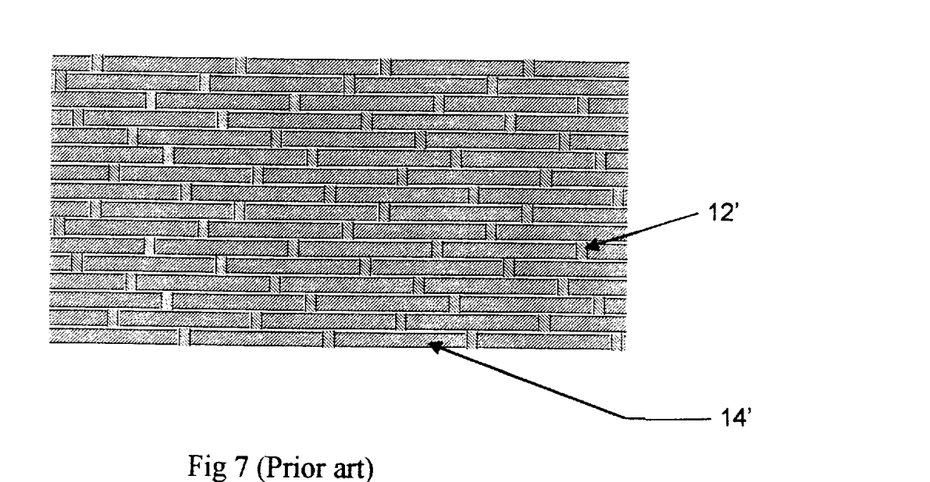
FIG. 7 is a schematic plan view of the interlacing of the weft and warp threads in the standard woven fabric shown in FIG. 5.

FIG. 7 illustrates a typical design structure of the woven tennis ball felt fabric 10' shown in FIG. 6 when viewed from the top surface. Weft threads 14' 'float' over the warp threads 12' interfacing with every eighth warp thread 12'. In this case the interlacings of the threads 12' and 14' form a conventional herringbone pattern.

According to a second embodiment of the invention, a three dimensional pattern in a tennis ball woven felt is produced by modifying the woven construction of a conventional woven felt to generate areas of tighter yarn interlacing compared to the remaining area or ground of the fabric. By modifying the construction of the fabric during weaving it is possible to create areas where the warp and weft threads interlace more frequently. The increased level of interlacing causes the threads in this area to be held together more tightly and the weft threads are prevented from bulking up during subsequent 'finishing' processes. The difference of thickness between the depressions and the remaining part of the fabric is therefore accentuated. Thus the areas of tighter interlacing are thinner than the ground of the fabric creating a three-dimensional pattern in the surface of the fabric.

FIG. 6 is a schematic cross-sectional diagram of a portion of a woven patterned felt fabric 30 according to the second embodiment of the invention showing an indented area 35 where the weft thread 34 is interlaced alternately with each warp thread 32. In so doing the weft thread 34 is held more tightly into the ground of the fabric 30 in this section creating a three dimensional pattern or indentation 35 in the surface.

The difference between the ground and the indentation 35 is usually exaggerated during the finishing processes (raising and milling steps) to produce the desired characteristics.

Figure 8:
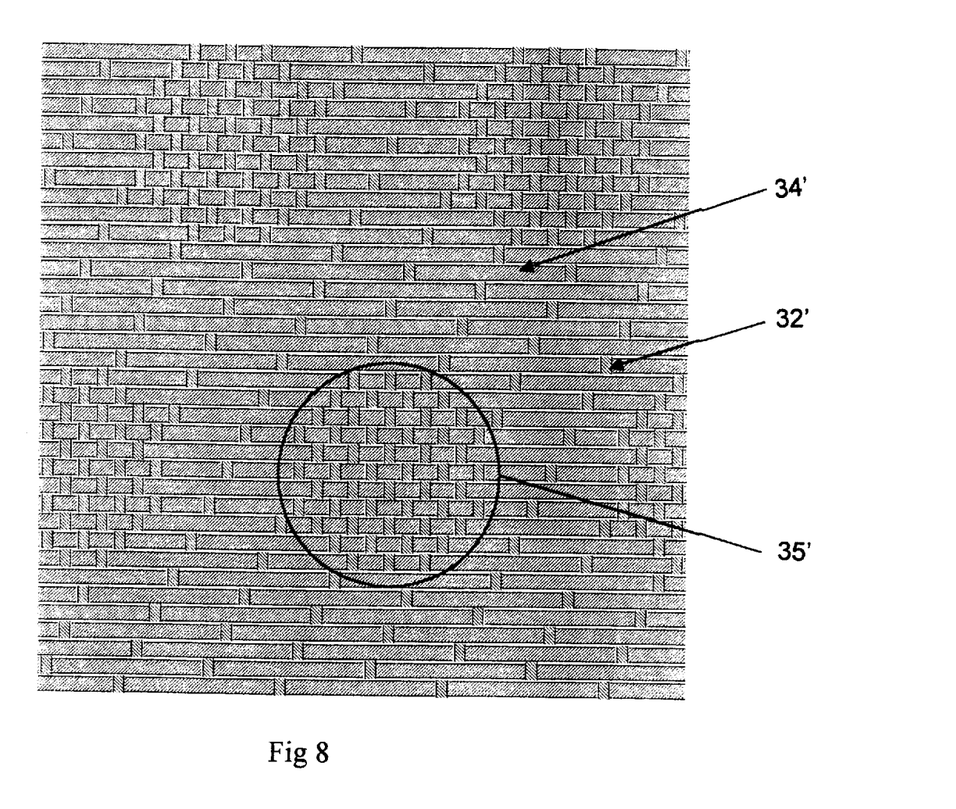
FIG. 8 is a schematic plan view of a portion of the interlacing of the weft and warp threads in a woven fabric similar to the one shown in FIG. 6.

FIG. 8 illustrates an enlargement of the appearance of the woven patterned tennis ball felt fabric 30' similar to the one shown in FIG. 6 viewed from the top surface. In this fabric 30' the 'ground' of the fabric 30' is shown with the weft threads 34' 'floating' over the warp thread 32' and interlacing, in this example, with the warp threads 32' at intervals of nine threads 32'. Also visible are areas of 'plain' weave 35' where the warp thread 32' interlaces each weft thread 34' alternately creating a more heavily interlaced 'motif' 35'. The fabric of FIG. 6 differs from the fabric of FIG. 8 only by the fact that in FIG. 6 the weft thread 34 interlace warp thread 32 at an interval of eight threads 32 instead of nine as in FIG. 8.

FIGS. 6 and 8 show that in these example the pattern is predominantly one of circular indentations 35 and 35'. When woven at 10 warp threads per centimetre and 13.4 weft threads per centimetre the fabric 30' shown in FIG. 8 gives, due to weft way shrinkage during the finishing process, an indented 'motif' of approximately 0.75 centimetres diameter in the finished felt with a spacing of 5 to 7 mm of normal felt between each indentation. However, by altering the layout of the interfacings it is possible, if required, to alter the shape and/or size of the motif.

Also by altering the frequency of the interfacings (i.e. the length of the 'float') in either or both the motif and the ground structure it is possible to alter the intensity of the motif, that is the degree of difference in definition and appearance between the ground of the cloth and the motif and thus the flight characteristic of the resultant ball. The fabric 30' may have a pattern of 7 mm circular indentations at 12 mm centres. The indentations 35' are provided in parallel rows each row offset from the next by 6 mm. At their deepest point, the dimples may be approximately 1.5 mm deep. The full felt thickness may be 3.5 mm deep.

It can therefore be seen that using the above process a three dimensional pattern similar to the one shown in FIG. 3 may be obtained although a wide variety of three dimensional patterns can be achieved by modifying the motif and ground combinations either by adjustment of the ground/motif interlacings and/or by adjustment of the size, shape and frequency of the motif. It can also be seen that by inverting the interlacings of the ground and motif the motif can be produced to form a raised pattern compared with the ground.

All these pattern variations will have, to a greater or lesser extent, an influence on the flight character of the ball when spin is imparted by the player.

An alternative method of producing a patterned tennis ball felt according a third embodiment of the invention is to apply a patterned needling technique either to a standard woven felt or to a felt made by non-woven technologies which is acceptable for tennis ball covering. The method is applied either after completing, or part way through, the conventional tennis felt manufacturing process. A sheet of such felt is passed through a needfelting machine, i.e. a needleloom, which contains a reciprocating board. The board extends across the full width of the felt and is set with barbed or forked needles which project from the board in a specific pattern. As the needleboard reciprocates the needles penetrate the felt catching fibres or small clumps of fibre and pushing them into the body of the felt. This causes increased fibre entanglement and felt consolidation at the pint of impact. When the needles are withdrawn the felt is drawn forward so the next penetration of the needle is offset from the previous penetration. The steps are repeated as required to create the desired pattern of indentations in the felt.

The needleboard is then raised clear of the felt which is then drawn through the machine a specific distance before the cycle is repeated.

Figure 9:
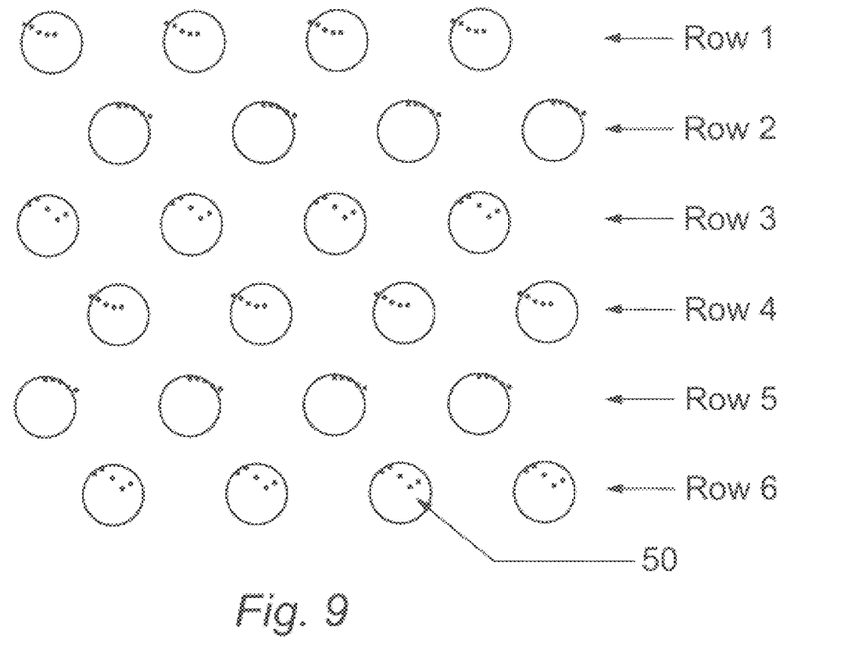
FIG. 9 is a schematic view of a needleboard layout set up of a needleboard machine which may be used to produce a fabric according to a third embodiment of the invention.

FIG. 9 shows a possible needleboard layout set up to produce a pattern of circular indentations similar to the one shown in FIG. 3. The needles 50 (which are represented as small black dots) are set in a pattern which repeats over 6 rows. Rows 1, 2 and 3 each have a different configuration of needles 50. This configuration is then repeated in rows 4, 5 and 6 with the needle pattern in each row being offset one place. After each needling cycle the needles are withdrawn and the felt drawn forward through two rows. Thus, the needled pattern from row 1 has the pattern from row 3 and then row 5 superimposed. The pattern from row 2 has the pattern from row 4 and row 6 superimposed. The needle patterns from rows 1, 3 and 5 or rows 2, 4 and 6 combine to produce the desired symmetrical indentation or 'dimple' in the felt, each indentation having been produced by a total of 15 needles 50. It is desirable that the process be repeated several times by following groups of 6 needle rows which repeat the process and reinforce the effect produced by the groups before them.

Figure 10:
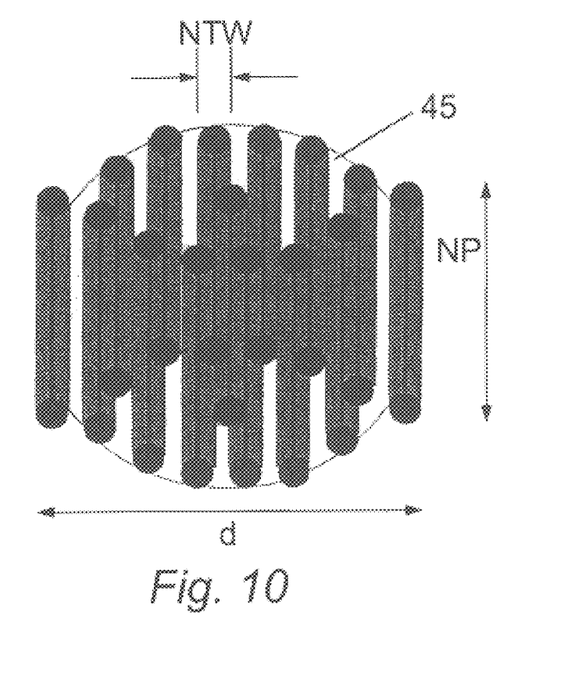
FIG. 10 is a schematic representation of the needling pattern of a single indentation after a needling cycle following the set up shown in FIG. 9 has been completed.

FIG. 10 is a schematic showing the needling pattern of a single indentation 45 after the 3 rows needling cycle has been completed. As shown in FIG. 10, after the first needling cycle this indentation 45 will constitute in a series of vertical depressed lines. However, successive cycles will give to the indentation 45 the general "dimpled" pattern. In FIG. 10 "d" is the general diameter of the depression 45; "NP" is the Needle Path length covered by each needle 50; "NTW" is Needle Tracking Width or the width of the depression created by each needle 50 during its cycle.

The patterns achieved using needling techniques are not as clearly defined as those produced using a modified woven construction and, to obtain more acceptable results, it is advisable to shear the back of the felt very severely to remove the excess fibres driven through the back of the felt by the action of the needles.

In another alternative, protuberances instead of depressions may be formed on the playing surface of the felt by processing the felt through the patterned needling machine from the back side. This could be a modification of the needling process already described.

A further alternative method of producing a patterned tennis ball felt is described as follows. This method is appropriate for producing patterned felt using nonwoven technology. With this method two separate layers of standard needle felt material are produced and subsequently needled together. Preferably, one, the bottom layer, contains the support scrim, while the second, top or outer layer, contains no scrim. Each layer can be structured for fibre content, weight and needling density to optimise the end product performance.

Preferably the bottom layer, including the scrim, will constitute between 40% and 70% by weight of the material.

Preferably the scrim will be warp knitted from polyamide or polyester filament yarn.

After pre-needling the top layer is processed through a stamping or die-cutting machine which punches out sections of material in a pre-determined pattern forming a punched fibre matrix. The hole size, shape and pattern punched out can be altered according to the requirements for the finished material.

Preferably the punched holes are circular in shape with a diameter of between 5 mm and 20 mm.

Preferably the holes are punched in a regular pattern.

Preferably the holes so punched are separated by material with a width of between 50% and 150% of the diameter of the holes.

Figure 11:
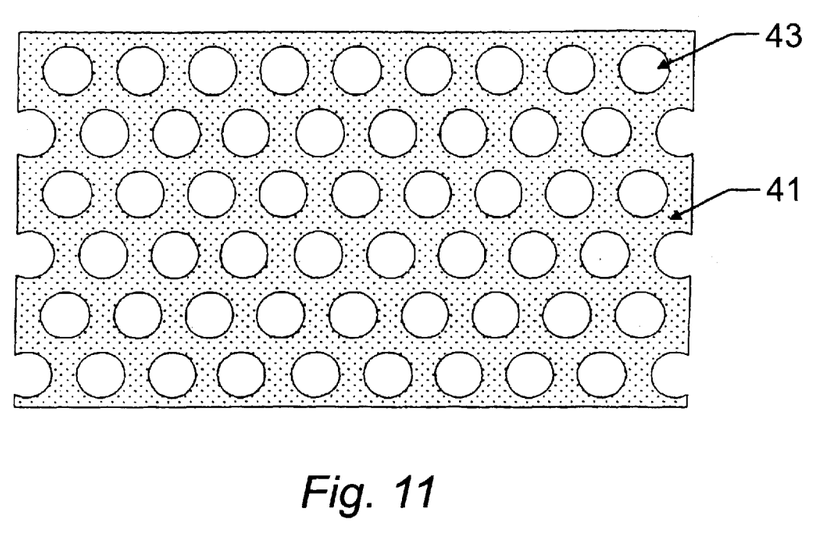
FIG. 11 is a schematic plan view of an outer layer of fabric used to make a fabric for covering a tennis ball according to a fourth embodiment of the invention.

FIG. 11 shows a view of a possible punched piece of pre-needled top layer of a felted fabric 41, advantageously a felt. In this case the felt 41 has a pattern of 10 mm circular holes 43 punched from it at 15 mm centres. The holes 43 are set in parallel rows each row offset by 7.5 mm. The overall appearance of the fabric 40 is similar to the one shown in FIG. 3. Obviously, in other embodiments these dimensions will vary depending on the desired hole shape and pattern. The two layers of felt, the bottom layer containing the scrim and the top layer containing the punched holes, are then needled together to form a single composite material.

Figure 12:
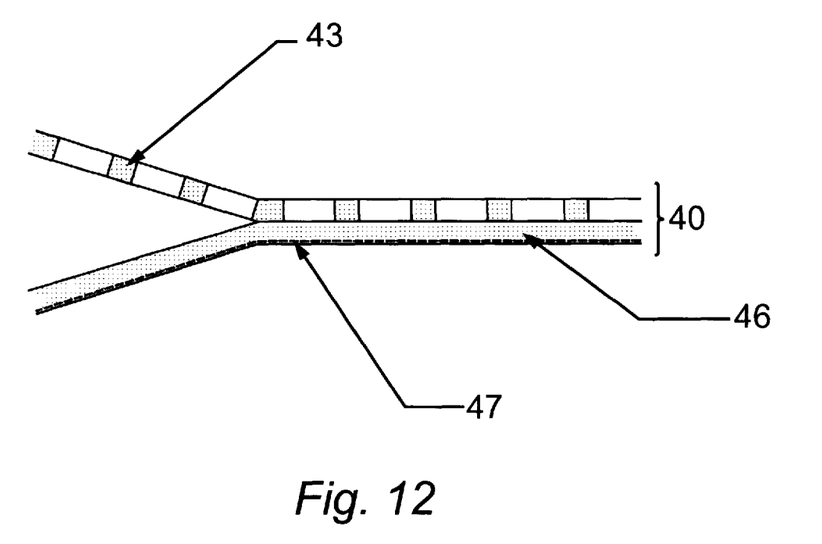
FIG. 12 is a schematic representation of the two layers of fabric used to make a sheet of fabric for covering a tennis ball according to a fourth embodiment of the invention being brought together to form said fabric for covering tennis ball.

FIG. 12 shows a cross sectional representation of the two layers of pre-needled felt being brought together to form the composite fabric 40. The outer layer 41 is punched with holes 43. The bottom 46 layer contains the scrim 47.

The composite needled fabric 40 may, if required, be subjected to finishing processes to enhance the aesthetic and wear characteristics of the felt and ball.

A further possibility would be to pass a piece of felt through a conventional Calendering Machine. This would involve passing the felt between heated rolls under pressure. The roll pressing on the top (i.e playing) surface of the felt would have a embossed pattern which would be a "negative" of that required for the felt. The pressure and heat applied would compress the felt and set it into the desired pattern.

According to another possibility, the dimples may be provided using conventional textile patterning techniques. For example, the textile patterning process described in U.S. Pat. No. 5,404,626 (known as the MILLITEX process) may be used. However these two last methods (ie the Millitex process and the compression process) are less preferred.

Figure 13:
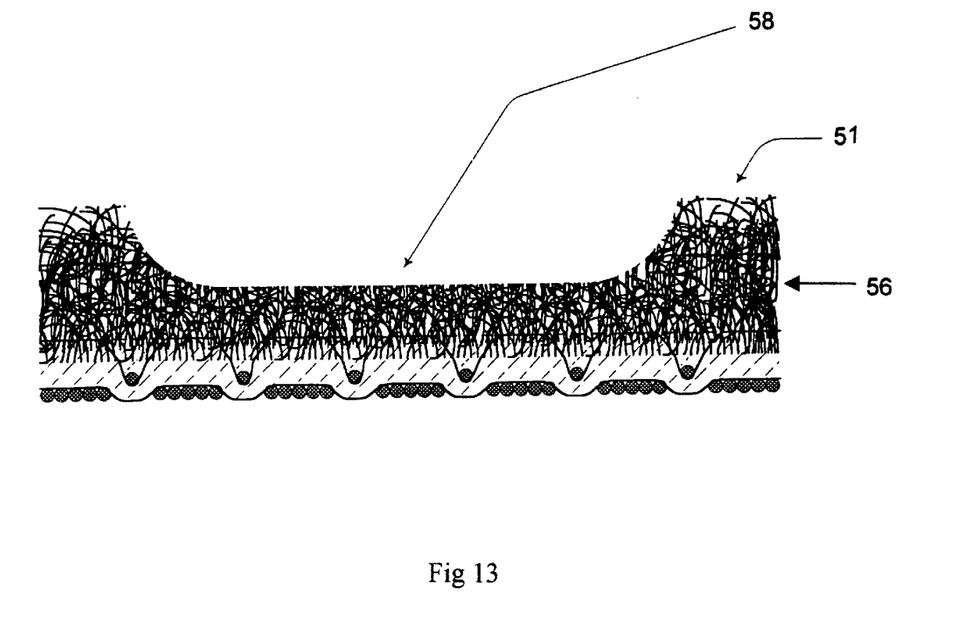
FIG. 13 is a schematic cross-sectional view of a fabric according the invention showing the general profile of a dimple.

FIG. 13 represents a cross-sectional schematic view of a woven fabric 50 made according to the invention having the preferred circular dimples 58 in the felted layer 56. FIG. 13 aims to represent the 36 general profile of such dimples 58. The actual structure of the fabric 50, and especially the felted layer 56, may vary depending of the method used to manufacture it.

Woven felt produced as described above thus can be used by the ball manufacturer without any significant modification to the covering process. The back side of the fabric is smooth enough to be coated with adhesive in the conventional manner and dumbbell shapes, when cut, can be fitted to the ball core using standard semi-automatic covering equipment.

Tennis balls made using the textile of the present invention have significant advantages over known tennis balls, for example because of the improved flight characteristics. Tennis players can exercise a far greater degree of control over the ball, and hence their game.

Modifications and improvements may be made to the foregoing without departing from the scope of the invention.

What is claimed is:

1. A fabric for use as a tennis ball covering said fabric having a felted outer surface composed of entangled fibres, said fabric being a woven fabric comprising interlaced warp and weft threads, said outer surface being provided with a three dimensional pattern thereon, wherein said three dimensional pattern comprises a series of depressed and non-depressed areas and is generated by the variation of the interlacing frequency of said warp and weft threads and wherein said warp and weft threads in said depressed areas are interlaced more frequently than in said non-depressed areas.

2. The fabric of claim 1, wherein said depressed areas are created by increasing the frequency of the interlacing of warp and weft threads.

3. The fabric of claim 1, wherein the non-depressed areas are created by the weft threads interlacing every 5 to 10 warp threads and the depressed area are created by the weft threads interlacing 1 to 3 warp threads.

4. The fabric of claim 1 wherein said three dimensional pattern is generated by the variation in the entanglement rate of the fibres of the felted outer surface.

5. The fabric of claim 4, wherein said variation in the entanglement rate is produced by needle felting techniques.

6. A fabric for use as a tennis ball covering said fabric having a felted outer surface composed of entangled fibres, said outer surface being provided with a three dimensional pattern thereon, wherein said fabric comprises at least a support layer and an outer layer, said outer layer having a pattern cut through it and being affixed on the support layer to create said three dimensional pattern.

7. The fabric of claim 6, wherein the support layer includes a scrim and constitutes between 40 and 70% of the weight of the fabric.

8. The fabric of claim 1, wherein the three dimensional pattern is a pattern of regular indentations on the surface of the fabric.

9. The fabric of claim 8, wherein the three-dimensional pattern is a pattern of dimples.

10. The fabric of claim 8, wherein the indentations are circular in shape.

11. The fabric of claim 8, wherein the indentations are to between 30% and 70% of the full thickness of the fabric.

12. The fabric of claim 8, wherein the each indentation has a diameter which is at its widest part between 5 mm and 20 mm.

13. The fabric of claim 8, wherein the indentations are separated by a portion of full thickness textile.

14. The fabric of claim 1, wherein the three dimensional pattern is formed on the fabric before the fabric is applied to a tennis ball.

15. A method to manufacture the fabric of claim 1, which comprises the steps of interlacing warp and weft threads and generating a three dimensional pattern by varying the interlacing frequency of said warp and weft threads.

16. A method to manufacture the fabric of claim 4, which comprises the steps of creating a three dimensional pattern by varying the entanglement rate of the fibres of the felted outer surface.

17. A method to manufacture the fabric of claim 6, which comprises the steps of providing at least a support layer and an outer layer, said outer layer having a pattern cut through it and affixing said outer layer on the support layer to create said three dimensional pattern.

* * * * *